UNITED STATES PATENT OFFICE 2,448,869

TRIMETHYLENEBENZOMORPHOLINE AZO COMPOUNDS

Joseph B. Dickey, Rochester, N. Y., and James G. McNally, Kingsport, Tenn., assignors to Eastman Kodak Company, Rochester, N. Y., a corporation of New Jersey No Drawing. Application November 15, 1945, Serial No. 628,964

7 Claims. (Cl. 260—152)

This invention relates to azo compounds which are useful as dyes for cellulose carboxylic ester textiles and nylon textiles, and to azo compounds which are useful as dyes for regenerated cellulose textiles, cotton textiles, silk textiles, woolen textiles and textiles made from synthetic protein-like materials.

We have found that the azo compounds having the general formula:

wherein R represents an aryl group of the benzene series or an aryl group of the naphthalene series and $R_1$ represents a 4,5-trimethylenebenzomorpholine nucleus joined to the azo bond through the carbon atom in its 7-position constitute valuable dyes useful for a variety of purposes, especially the dyeing of textiles as set forth above.

It is, accordingly, an object of our invention to provide new azo dyes and a process for the preparation thereof. Other objects will become apparent hereinafter.

The azo compounds of our invention can be prepared by coupling a diazotized primary aromatic amine of the benzene or naphthalene series with a 4,5-trimethylenebenzomorpholine containing no substituent in its 7-position. The 4,5-trimethylenebenzomorpholine compound should contain no substituent in its 7-position because this is the position in which coupling occurs.

For purposes of clarity the 4,5-trimethylenebenzomorpholine nucleus is numbered as follows:

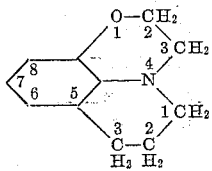

The numbering just indicated is that which will be used throughout the specification and claims. Where there is a substituent on the trimethylene grouping, the substituent and its position on the trimethylene grouping will modify trimethylene and the whole will be placed in parenthesis, e. g. 4,5-(2-hydroxytrimethylene)-benzomorpholine.

As clearly shown hereinafter the 4,5-trimethylenebenzomorpholine coupling component can be substituted, for example, with substituents such as a halogen atom, an alkyl group, an alkoxy group, an acylamino group or a hydroxy group.

Typical of the primary aromatic amines which are diazotized and coupled with the 4,5-trimethylenebenzomorpholine tricyclic compounds are: p-nitroaniline, o-chloro-p-nitroaniline, o-bromo-p-nitroaniline, o-fluoro-p-nitroaniline, o-cyano-p-nitroaniline, o-methylsulfonyl-p-nitroaniline, o-acetyl-p-nitroaniline, o-(N-ethylsulfamyl)-p-nitroaniline, o-trifluoromethyl-p-nitroaniline, o-methyl-p-nitroaniline, o-methoxy-p-nitroaniline, 2,6-dichloro-4-nitroaniline, o-nitroaniline, o-nitro-p-chloroaniline, o-nitro-p-fluoroaniline, 2,4-dinitroaniline, 6-trifluoromethyl-2,4-dinitroaniline, 6-chloro-2,4-dinitroaniline, 6-bromo-2,4-dinitroaniline, 6-iodo-2,4-dinitroaniline, 6-hydroxy-2,4-dinitroaniline, 6-fluoro-2,4-dinitroaniline, 2,4-dinitro-6-(N-methylsulfamyl)-aniline, 6-acetyl-2,4-dinitroaniline, 6-cyano-2,4-dinitroaniline, 6-methyl-2,4-dinitroaniline, 6-methoxy-2,4-dinitroaniline, p-aminoacetophenone, p-toluidine, m-toluidine, o-toluidine, p-aminoacetanilide, m-trifluoromethylaniline, 3-chloro-6-methoxyaniline, 4-chloro-3-trifluoromethylaniline and 4-nitro-1-aminonaphthalene. All of the foregoing primary amines diazotized and coupled with the 4,5-trimethylenebenzomorpholine compounds give azo dyes of use in the coloration of cellulose carboxylic ester textiles, in the coloration of nylon textiles, in the coloration of cellulose carboxylic ester plastics and in the coloration of polyvinyl plastics.

Typical of primary aromatic amines which can be diazotized and coupled with the 4,5-trimethylenebenzomorpholine compounds to give dyes useful in the coloration of cotton textiles, regenerated cellulose textiles, etc., are: 2-amino-5-nitrobenzene sulfonic acid, 2-amino-3,5-dinitrobenzene sulfonic acid, dianisidine disulfonic acid, 3-methyl-4-(4-nitro-2-sulfophenylazo)-aniline, 1-amino-8-naphthol-2,4-disulfonic acid, 1-naphthylamine-5-sulfonic acid, 1-naphthylamine-6-sulfonic acid, 1-naphthylamine-4,8-disulfonic acid, 1-amino-8-naphthol-3,6-disulfonic acid and 2-amino-8-naphthol-3,6-disulfonic acid.

Typical of the 4,5-trimethylenebenzomorpholine coupling components are: 4,5-trimethylenebenzomorpholine, 3-methyl-4,5-trimethylenebenzomorpholine, 3-ethyl-4,5-trimethylenebenzomorpholine, 8-methyl-4,5-trimethylenebenzomorpholine, 8-chloro-4,5-trimethylenebenzomorpholine, 8-methoxy-4,5-trimethylenebenzomorpholine, 8-acetamino-4,5-trimethylenebenzomorpholine, 6-methyl-4,5-trimethylenebenzomorpholine, 6-chloro-4,5-trimethylenebenzomorpholine, 6-acetamino-4,5-trimethylenebenzomorpholine, 4,5-(2-hydroxytrimethylene)-benzomorpholine, 6-acetamino-4,5-(2-hydroxytrimethylene)-benzomorpholine, 6-chloro-4,5-(2-hydroxytrimethylene)- benzomorpholine, 3-methyl-4,5 - (2 - hydroxytrimethylene)-benzomorpholine, 8-methoxy-4,5-(2-hydroxytrimethylene)-benzomorpholine, 3-8-dimethyl - 4,5 - (2 - hydroxytrimethylene) - benzomorpholine, 2-methyl - 4,5 - trimethylenebenzomorpholine, 2-methyl-(2-hydroxytrimethylene)-benzomorpholine, 6-methoxy-4,5 - trimethylenebenzomorpholine, 8-bromo-4,5-trimethylenebenzomorpholine, 8-chloro-4,5-(2-hydroxytrimethylene)-benzomorpholine and 3-methyl-8 - chloro-4,5-trimethylenebenzomorpholine.

EXAMPLE 1

7-(p-nitrophenylazo)-3-methyl-4,5-[(1 - methyl-2-hydroxy) trimethylene]-benzomorpholine

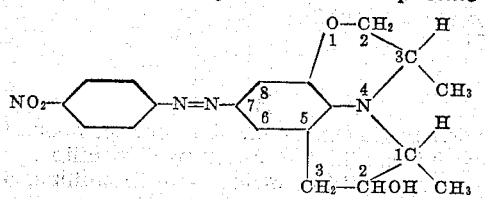

13.8 grams of p-nitroaniline are added to 200 cc. of water and 36 grams of 36% hydrochloric acid. The resulting mixture is then cooled to a temperature approximating 0-5° C. by adding ice and the p-nitroaniline diazotized by adding 6.9 grams of sodium nitrite dissolved in 30 cc. of water. Upon completion of the diazotization reaction the cold diazo solution is added to an iced solution of 21.9 grams of 3-methyl-4,5-[(1-methyl-2-hydroxy) trimethylene] - benzomorpholine in dilute hydrochloric acid. Coupling is completed by adding sodium carbonate to neutralize the mineral acid. The azo dye formed is filtered off, washed with water and dried. It colors cellulose acetate rayon textiles and nylon textiles rubine shades from an aqueous suspension.

EXAMPLE 2

7-[6-(N-β-methoxyethylsulfamyl) - 2,4 - dinitrophenylazo] - 3 - methyl - 4,5-[(1-methyl-2-hydroxy) trimethylene]-benzomorpholine

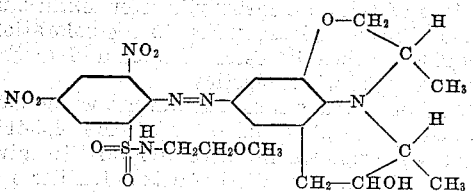

25 cc. of sulfuric acid (95-96%) are cooled in an iced bath. 8 grams of dry sodium nitrite are added to the cold sulfuric acid with vigorous stirring over a period of about one minute. The resulting mixture is stirred until a clear solution of nitrosyl sulfuric acid is obtained. The reaction mixture is then cooled to 12° to 14° C. and 110 cc. of cold acetic acid are added. The resulting mixture is chilled to 1° C. and 32 grams (0.1 mole) of 2,4-dinitro-6-(N-β-methoxyethylsulfamyl)-aniline are added together with 100 cc. of acetic acid, while maintaining the temperature at 4° C. to 5° C. The resulting mixture is stirred at 4°-5° C. for two hours and then poured into two liters of ice water. The resulting precipitate is filtered off by suction and washed with water to remove acid. The precipitate is then suspended in 250 cc. of acetic acid and the suspension cooled to 0° C. To this suspension are added 21.9 grams of 3-methyl-4,5-[(1-methyl-2-hydroxy) trimethylene]-benzomorpholine in cold acetic acid. The coupling reaction which takes place is completed by allowing the mixture to stand for 10 to 12 hours. The resulting solution is then poured into ice water and the dye which separates is filtered off, washed with water and dried. It colors cellulose acetate rayon textiles and nylon textiles blue from an aqueous suspension.

EXAMPLE 3

7-[2-(N-β-hydroxyethylsulfamyl)-4 - nitrophenylazo]-3-methyl-4,5-[(1-methyl - 2 - hydroxy) trimethylene]-benzomorpholine

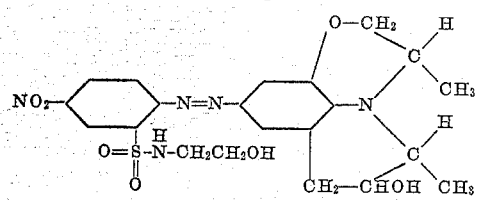

26 grams (0.1 mole) of 2-(N-β-hydroxyethylsulfamyl)-4-nitroaniline are diazotized and the diazonium compound obtained is coupled with 21.9 grams (0.1 mole) of 3-methyl - 4,5 - [(1-methyl-2-hydroxy) trimethylene]-benzomorpholine. The diazotization, coupling and recovery operations are carried out in accordance with the procedure described in Example 2. The dye compound obtained colors cellulose acetate rayon textiles and nylon textiles violet from an aqueous suspension.

EXAMPLE 4

7-(p-acetylphenylazo)-4,5-trimethylenebenzomorpholine

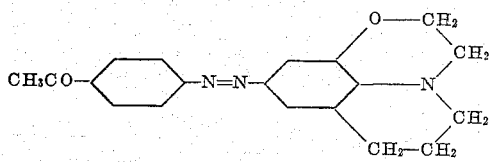

135 grams (1 mole) of p-aminoacetophenone are suspended in 1000 grams of water and 290 grams of concentrated hydrochloric acid. The mixture is cooled to 0° to 5° C. by adding ice. Diazotization is effected by adding 69 grams of sodium nitrite dissolved in 300 cc. of water. The cold diazo solution is added to an iced solution of 175 grams (1 mole) of 4,5-trimethylenebenzomorpholine in dilute hydrochloric acid. Coupling is completed by adding sodium carbonate in quantities sufficient to neutralize the mineral acid. The azo dye formed is filtered off, washed with water and dried. The dye colors cellulose acetate rayon textiles and nylon textiles orange shades from an aqueous suspension.

EXAMPLE 5

7-(p-nitrophenylazo)-3-methyl-4,5-(2-hydroxytrimethylene)-benzomorpholine

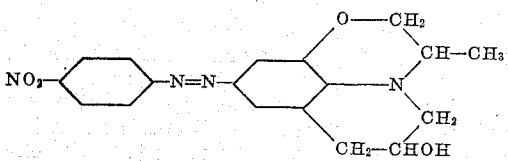

138 grams (1 mole) of p-nitroaniline are suspended in 1000 grams of water and 290 grams of concentrated hydrochloric acid (36%). The mixture is cooled to 0° to 5° C. by adding ice. Diazotization is effected by adding 69 grams of sodium nitrite dissolved in 300 cc. of water. The cold diazo solution is added to an iced solution of 205 grams (1 mole) of 3-methyl-4,5-(2-hydroxy-trimethylene)-benzomorpholine in dilute hydrochloric acid. Coupling is completed by adding sodium carbonate to neutralize the mineral acid. The azo dye formed is then recovered by filtration, washed with water and dried. It colors cellulose acetate rayon textiles and nylon textiles rubine shades from an aqueous suspension.

EXAMPLE 6

7-(6-chloro-2,4-dinitrophenylazo) -3,8-dimethyl-4,5-(2-hydroxytrimethylene) -benzomorpholine

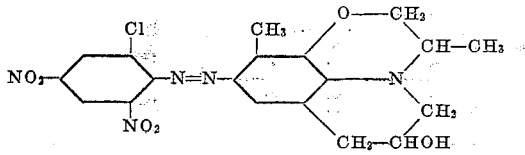

7.6 grams of sodium nitrite (dry) are added slowly with vigorous stirring to 50 cc. of sulfuric acid (95–96 per cent). The resulting mixture is stirred until a clear solution of nitrosyl sulfuric acid is obtained. The resulting solution is then cooled to 12° to 14° C. and 120 grams of acetic acid are added with stirring. Then 21.7 grams (0.1 mole) of 6-chloro-2,4-dinitroaniline and 100 grams of acetic acid are added to the mixture simultaneously with stirring at 15° C. Stirring at 15° C. is continued for 2 hours. The resulting diazo solution is poured onto 1000 grams of ice. The resulting iced solution is added to an iced solution of 21.4 grams (0.1 mole) of 3,8-dimethyl - 4,5-(2-hydroxytrimethylene) - benzomorpholine in dilute hydrochloric acid. Coupling is completed by adding sodium bicarbonate until the mineral acid is practically neutralized. The azo dye formed is filtered off, washed with water and then dried. It colors cellulose acetate rayon textiles and nylon textiles reddish-blue from an aqueous suspension.

EXAMPLE 7

7-[6-(N-ethylsulfamyl) - 2,4 - dinitrophenylazo]- 3,8-dimethyl - 4,5 - (2 - hydroxytrimethylene) - benzomorpholine

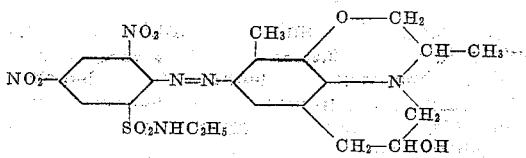

29 grams (0.1 mole) of 2,4-dinitro-6-(N-ethylsulfamyl)-aniline are diazotized and the diazonium compound obtained is coupled with 21.9 grams (0.1 mole) of 3,8-dimethyl-4,5-(2-hydroxytrimethylene)-benzomorpholine. The diazotization, coupling and dye recovery operations can be carried out in accordance with the procedure described in Example 2. The dye compound obtained colors cellulose acetate rayon textiles and nylon textiles blue from an aqueous suspension.

EXAMPLE 8

7-(p-nitrophenylazo) - 4,5-[(1-methylol - 2 - hydroxy) trimethylene] benzomorpholine 13.8 grams of p-nitroaniline are diazotized and the diazonium compound obtained is coupled with 20.7 grams of 4,5-[1-methylol-2-hydroxy) trimethylene]-benzomorpholine. The diazotization, coupling and dye recovery operations can be carried out in accordance with the procedure described in Example 1. The dye compound obtained colors cellulose acetate rayon textiles and nylon textiles rubine shades from an aqueous suspension.

EXAMPLE 9

7 - (p - acetylphenylazo) - 3-trifluoromethyl-4,5- [(1 - methyl-2-hydroxy) trimethylene] - benzomorpholine 13.5 grams of p-aminoacetophenone are diazotized and the diazonium compound obtained is coupled with 27.3 grams of 3-trifluoromethyl-4,5- [(1-methyl - 2 - hydroxy)trimethylene] - benzomorpholine. The diazotization, coupling and dye recovery operations can be carried out in accordance with the procedure described in Example 1. The dye compound obtained colors cellulose acetate rayon textiles and nylon textiles orange shades from an aqueous suspension.

30.3 grams of 3-trifluoromethyl-6-methoxy-4,5- [(1-methyl - 2 - hydroxy)trimethylene] - benzomorpholine and 30.8 grams of 8-chloro-3-trifluoromethyl - 4,5 - [(1 - methyl - 2-hydroxy)trimethylene]-benzomorpholine can be substituted for the trimethylenebenzomorpholine compound of the example to obtain dye compounds which similarly color cellulose acetate rayon textiles and nylon textile orange shades from an aqueous suspension.

EXAMPLE 10

7-(p-nitrophenylazo) - 3 - methyl - 6 - trifluoromethyl-4,5-(2-hydroxytrimethylene) - benzomorpholine 13.8 grams of p-nitroaniline are diazotized. The diazonium compound obtained is coupled with 27.3 grams of 3-methyl-6-trifluoromethyl-4,5-(2-hydroxytrimethylene) - benzomorpholine. The diazotization, coupling and dye recovery operations can be carried out in accordance with the procedure described in Example 1. The dye compound obtained colors cellulose acetate rayon textiles and nylon textiles rubine shades from an aqueous suspension.

In a manner similar to that illustrated in the foregoing examples, the following azo compounds can be prepared:

| Diazo Component | Coupling Component | Color on Cellulose Acetate and Nylon Textiles |
|---|---|---|
| p-aminoacetophenone | (1) 4,5-trimethylenebenzomorpholine | orange. |
| Do | (2) 3-methyl-4,5-(2-sulfatotrimethylene)-benzomorpholine sodium salt | Do. |
| Do | (3) 3-methyl-4,5-(2-hydroxy-trimethylene)-benzomorpholine | Do. |
| Do | (4) 3,8-dimethyl-4,5-trimethylenebenzomorpholine | Do. |
| Do | (5) 3,6-dimethyl-4,5-trimethylenebenzomorpholine | reddish-orange. |
| Do | (6) 8-acetamino-4,5-trimethylenebenzomorpholine | red. |
| Do | (7) 4,5-[(1-methylol-2-hydroxy) trimethylene]-benzomorpholine | Do. |
| Do | (8) 4,5-[(1-methyl-2-hydroxy) trimethylene]-benzomorpholine | Do. |
| Do | (9) 3-methyl-6-trifluoromethyl-4,5-trimethylenebenzomorpholine | orange. |
| Do | (10) 8-chloro-3-trifluoromethyl-4,5-(2-hydroxytrimethylene)-benzomorpholine | Do. |
| Do | (11) 3-trifluoromethyl-6-methoxy-4,5-[(1-methyl-2-hydroxy) trimethylene]-benzomorpholine. | red. |
| Do | (12) 3-methyl-4,5-[(1-methyl-2-hydroxy) trimethylene]-benzomorpholine | orange. |
| Do | (13) 3-methyl-4,5-[(1-methylol-2-hydroxy) trimethylene]-benzomorpholine | Do. |
| Do | (14) 8-methoxy-3-methyl-4,5-[(1-methylol-2-hydroxy) trimethylene]-benzomorpholine. | Do. |

| Diazo Component | Coupling Component | Color on Cellulose Acetate and Nylon Textiles |
|---|---|---|
| p-aminoacetophenone | (15) 4,5-(1-methyltrimethylene)-benzomorpholine | orange. |
| Do | (16) 6-acetamino-4,5-(2-hydroxy-trimethylene)-benzomorpholine | red. |
| Do | (17) 3-trifluoromethyl-4,5-(2-hydroxytrimethylene)-benzomorpholine | orange. |
| Do | (18) 3-trifluoromethyl-4,5-trimethylenebenzomorpholine | Do. |
| Do | (19) 3-trifluoromethyl-6-methoxy-4,5-trimethylenebenzomorpholine | red. |
| o-methylsulfonyl-aniline | 1 to 19 above | orange to red. |
| p-methylsulfonyl-aniline | do | Do. |
| 4-thiocyano-2-nitroaniline | do | orange to rubine. |
| p-aminoazobenzene | do | Do. |
| p-nitroaniline | do | Do. |
| o-fluoro-p-nitroaniline | do | red to violet. |
| o-chloro-p-nitroaniline | do | Do. |
| o-bromo-p-nitroaniline | do | Do. |
| o-iodo-p-nitroaniline | do | Do. |
| 2-acetyl-4-nitrobenzene | do | Do. |
| 2-methylsulfonyl-4-nitrobenzene | do | Do. |
| 2-(N-ethylsulfamyl)-4-nitrobenzene | do | Do. |
| 2-(N-β-hydroxyethylsulfamyl)-4-nitrobenzene. | do | Do. |
| 2,4-dinitroaniline | do | reddish-blue. |
| 6-fluoro-2,4-dinitroaniline | do | rubine to green-blue. |
| 6-chloro-2,4-dinitroaniline | do | Do. |
| 6-bromo-2,4-dinitroaniline | do | Do. |
| 6-iodo-2,4-dinitroaniline | do | Do. |
| 2,4-dinitro-6-(N-ethylsulfamyl)-aniline. | do | Do. |
| 2,4-dinitro-6-(N-β-hydroxyethyl-sulfamyl)-aniline. | do | Do. |

Example 11

7-(4-nitro-2-sulfo)phenylazo-4,5-(2-hydroxytrimethylene)-benzomorpholine

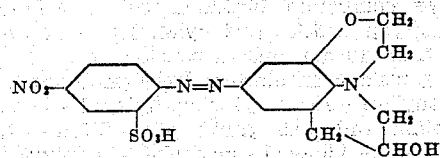

218 grams of 2-amino-5-nitrobenzene sulfonic acid are diazotized in known fashion and the diazonium compound obtained is coupled in a cold acetic acid medium with 19.1 grams of 4,5-(2-hydroxytrimethylene)-benzomorpholine. Coupling is completed by adding sodium acetate until the reaction medium is neutral to Congo Red paper. The dye compound formed is recovered by filtration and dried. Sodium chloride may be added if desired to aid in precipitating the dye. It colors regenerated cellulose, cotton, silk, wool and nylon violet shades.

Example 12

7-[(4,6-dinitro-2-sulfo)phenylazo]-4,5-[(1-methyl-2-hydroxy)trimethylene]-benzomorpholine 263 grams of 2-amino-3,5-dinitrobenzene sulfonic acid are diazotized in nitrosyl sulfuric acid, poured into water, and the diazonium compound obtained is coupled in a cold dilute aqueous hydrochloric acid medium with 20.5 grams of 4,5-[(-1-methyl-2-hydroxy) trimethylene]-benzomorpholine. Coupling is completed by adding sodium acetate until the reaction mixture is neutral to Congo Red paper. The dye compound formed is recovered by filtration and dried. Sodium chloride may be added if desired to aid in precipitating the dye. It colors regenerated cellulose, cotton, silk, wool and nylon blue shades.

Example 13

33.6 grams of

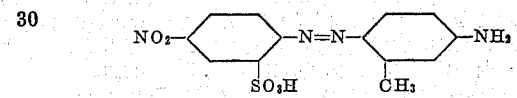

are diazotized in known fashion and the diazonium compound is coupled in a cold dilute hydrochloric acid medium with 18.9 grams of 3-methyl-4,5-trimethylenebenzomorpholine. Coupling and recovery of the dye compound formed can be carried out in accordance with the procedure described in Example 12. The dye compound obtained colors regenerated cellulose, cotton, silk, wool and nylon rubine shades which can be afterchromed.

Example 14

31.9 grams of 1-amino-8-naphthol-2,4-disulfonic acid are diazotized in known fashion and the diazonium compound obtained is coupled with 25.9 grams of 3-trifluoromethyl-4,5-(2-hydroxytrimethylene)-benzomorpholine in a cold dilute hydrochloric acid solution. Coupling and recovery of the dye compound formed can be carried out in accordance with the procedure described in Example 12. The dye compound obtained colors regenerated cellulose, cotton, silk, wool and nylon violet shades.

Similarly the compounds indicated in the following tabulation can be prepared following the procedure described hereinbefore. They are useful for the coloration of regenerated cellulose, cotton, silk, wool and nylon.

| Amine | Coupling Component |
|---|---|
| 1-naphthylamine-5-sulfonic acid | (1) 4,5-trimethylenebenzomorpholine. |
| Do | (2) 4,5-(2-hydroxytrimethylene)-benzomorpholine. |
| | (3) 3-methyl-4,5-[(1-methyl-2-hydroxy) trimethylene]-benzomorpholine. |
| 2-naphthylamine-8-sulfonic acid | Coupling Components 1-3 above. |
| 1-amino-2-chloro-4-sulfonic benzene | Do. |
| p-sulfanilic acid | Do. |

The 4,5-trimethylenebenzomorpholine compounds used in the preparation of the azo compounds of our invention can be prepared, for example, by heating a benzomorpholine compound, unsubstituted in its 4- and 7-positions, with a 1,3-trimethylene halide such as 1,3-trimethylene dibromide ($BrCH_2CH_2CH_2Br$), 1,3-trimethylene dichloride ($ClCH_2CH_2CH_2Cl$), a trimethylene-1,3-dihalo-2-hydrin such as trimethylene-1,3-dichloro-2-hydrin

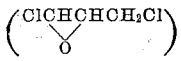

or 1,3-dibromo-2-hydrin

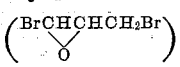

1,3-dichlorobutanol-2 ($ClCH_2CHOHCHClCH_3$), a glyceroldihalohydrin such as glyceroldichlorohydrin ($ClCH_2CHOHCH_2Cl$) or a 1,3-dihalobutanediol-2,4 such as 1,3-dichlorobutanediol-2,4

($ClCH_2CHOHCHClCH_2OH$)

For purposes of clarity the benzomorpholine nucleus is numbered as follows:

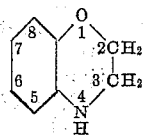

This numbering is that which is used by us herein.

Preparation of 4,5-trimethylenebenzomorpholine 135 grams of benzomorpholine are placed in a suitable reaction flask and heated under refluxing conditions with 210 grams of 1,3-trimethylene dibromide. When the refluxing reaction is complete the reaction mixture is heated to 180° C.–200° C. for four hours and then cooled. Sodium hydroxide is then added to destroy all the hydrogen bromide present and the 4,5-trimethylenebenzomorpholine formed is extracted with benzene and the extract distilled under reduced pressure (2 mm., for example) to recover 4,5-trimethylenebenzomorpholine. Some benzomorpholine is recovered during the distillation operation. If desired the reaction can be carried out in pyridine.

Preparation of 3-methyl-4,5-[(1-methyl-2-hydroxy)trimethylene]-benzomorpholine 149 grams of 3-methylbenzomorpholine are reacted in 600 cc. of butanol and 85 grams of pyridine in a suitable reaction flask with 160 grams of 1,3-dichlorobutanol-2 ($ClCH_2CHOHCHClCH_3$) for 3 hours at 80–85° C. and then under refluxing conditions until no more hydrogen chloride is formed. The reaction mixture is then treated with sodium hydroxide to destroy any hydrogen chloride present and after separation of the sodium chloride formed, the mixture is distilled under reduced pressure to obtain 3-methyl-4,5-[(1-methyl-2-hydroxy)trimethylene]-benzomorpholine.

Preparation of 3-methyl-4,5-(2-hydroxytrimethylene)-benzomorpholine

This compound can be prepared by reacting 149 grams of 3-methylbenzomorpholine with 125 grams of glyceroldichlorohydrin in accordance with the procedure described for the preparation of 3-methyl-4,5-[(1-methyl-2-hydroxy)trimethylene]-benzomorpholine.

Preparation of 3,8-dimethyl-4,5-(2-hydroxytrimethylene)-benzomorpholine

This compound can be prepared by reacting 163 grams of 3,8-dimethylbenzomorpholine with 130 grams of glyceroldichlorohydrin ($ClCH_2CHOHCH_2Cl$)

in accordance with the procedure described for the preparation of 3-methyl-4,5-[(1-methyl-2-hydroxy)trimethylene]-benzomorpholine.

Preparation of 4,5-[(1-methylol-2-hydroxy)trimethylene]-benzomorpholine

This compound can be prepared by reacting 135 grams of benzomorpholine with 160 grams of 1,3-dichlorobutanediol-2,4 in accordance with the procedure described for the preparation of 3-methyl-4,5-[(1-methyl-2-hydroxy)trimethylene]-benzomorpholine.

Preparation of 3-methyl-4,5-[(1-methylol-2-hydroxy)trimethylene]-benzomorpholine This compound can be prepared by substituting 149 grams of 3-methylbenzomorpholine for benzomorpholine in the preceding example.

Preparation of 3-trifluoromethyl-4,5-[(1-methyl-2-hydroxy)trimethylene]-benzomorpholine This compound can be prepared by reacting 203 grams of 3-trifluoromethylbenzomorpholine with 160 grams of 1,3-dichlorobutanol-2 following the general procedure described for the preparation of 3-methyl-4,5-[(1-methyl-2-hydroxy)trimethylene]-benzomorpholine.

Preparation of 3-trifluoromethyl-4,5-(2-hydroxytrimethylene)-benzomorpholine This compound can be prepared by using glycerol-dichlorohydrin ($ClCH_2CHOHCH_2Cl$) in place of 1,3-dichlorobutanol-2 in the foregoing example.

Preparation of 3-trifluoromethyl-6-methoxy-4,5-[(1-methyl-2-hydroxy)trimethylene]-benzomorpholine and 8-chloro-3-trifluoromethyl-4,5-[(1-methyl-2-hydroxy)trimethylene]-benzomorpholine These compounds can be prepared by reacting 233 grams of 3-trifluoromethyl-6-methoxybenzomorpholine and 237.5 grams of 3-trifluoromethyl-8-chlorobenzomorpholine, respectively, with 160 grams of 1,3-dichlorobutanol-2 following the general procedure described for the preparation of 3-methyl-4,5-[(1-methyl-2-hydroxy)-trimethylene]-benzomorpholine.

Preparation of 3-methyl-4,5-(2-sodium sulfato trimethylene)-benzomorpholine 20.5 grams of 3-methyl-4,5-(2-hydroxytrimethylene)-benzomorpholine are dissolved in 200 cc. of carbon tetrachloride and cooled to 0° C. Then 12 grams of chlorosulfonic acid are added with stirring over a period of 30 minutes. The reaction mixture is allowed to stand at room temperature over night and then neutralized with sodium bicarbonate following which it is shaken and allowed to settle and the desired product, which is colorless and water soluble, removed in the carbon tetrachloride layer. The residue remaining is extracted twice with 50 cc. portions of carbon tetrachloride and the carbon tetrachloride extracts are combined and distilled under reduced pressure (5 mm., for example) to recover the desired product.

Preparation of 3-methyl-6-trifluoromethyl-4,5-trimethylenebenzomorpholine, 3-methyl-6-trifluoromethyl-4,5-(2-hydroxytrimethylene)-benzomorpholine and 3-methyl-6-trifluoromethyl-4,5-[(1-methyl-2-hydroxy)trimethylene]-benzomorpholine These compounds can be prepared by reacting equivalent gram molecular weights of 3-methyl- 6-trifluoromethyl-benzomorpholine with 1,3-trimethylene dibromide, glyceroldichlorohydrin and 1,3-dichlorobutanol-2, respectively, in accordance with the procedure described hereinbefore

*Preparation of 3,6-dimethyl-4,5-trimethylenebenzomorpholine, 3,8-dimethyl-4,5 - trimethylenebenzomorpholine and 8-acetamino-4,5-trimethylenebenzomorpholine*

These compounds can be prepared by reacting 3,6 - dimethylbenzomorpholine, 3,8 - dimethylbenzomorpholine and 8-acetaminobenzomorpholine with 1,3-trimethylene dibromide in accordance with the procedure described for the preparation of 4,5-trimethylenebenzomorpholine.

*Preparation of 4,5-(1-methyltrimethylene)-benzomorpholine*

This compound can be prepared by reacting 135 grams of benzomorpholine with 130 grams of $ClCH_2CH_2CHClCH_3$ or 220 grams of $BrCH_2CH_2CHBrCH_3$ following the general procedure described for the preparation of 4,5-trimethylenebenzomorpholine.

It is to be understood that the examples of the dye compounds of our invention given hereinbefore are intended to be illustrative and not limitative of the invention as other diazo components and other 4,5-trimethylenebenzomorpholine coupling components can be employed. To illustrate, the 4,5-trimethylenebenzomorpholine compounds, and their substituted trimethylene derivatives, corresponding to the benzomorpholine compounds described hereinafter can be prepared following the procedure described hereinbefore and coupled with the diazo components mentioned herein. 3-ethyl - 4,5 - trimethylenebenzomorpholine, 8 - chloro - 4,5 - trimethylenebenzomorpholine, 8-acetamino-4,5-trimethylenebenzomorpholine and 8-methoxy-4,5-[(1-methyl-2-hydroxy)trimethylene] - benzomorpholine, for example, are illustrative of the many other 4,5-trimethylenebenzomorpholine coupling compounds that can be prepared.

From the foregoing, it is believed that the manner of preparation of the 4,5-trimethylenebenzomorpholine coupling components is apparent to those skilled in the art and no further description of their preparation is thought necessary.

The benzomorpholine compounds from which the 4,5-trimethylenebenzomorpholine compounds are prepared can be prepared in any convenient way. While their manner of preparation constitutes no part of the invention claimed herein, the preparation of certain of these compounds is disclosed hereinafter.

*Preparation of benzomorpholine*

This compound can be prepared as described in Berichte der Deutschen Chemischen Gesellschaft, vol. 22, pages 2095 and 2096.

*Preparation of 3-methylbenzomorpholine*

To a warm solution of 1 gram mole of 2-nitrophenol in 800 cc. of ethyl alcohol are added with stirring 100 grams of an aqueous 40% sodium hydroxide solution. Then 0.1 gram mole of sodium iodide is added in one portion and 1.1 gram moles of α-chloromethylketone

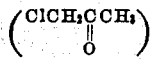

are added portionwise. The reaction mixture is refluxed with stirring until reaction is complete and then evaporated to dryness under reduced pressure. The residue is then slurried in water to remove inorganic salts and filtered. The precipitate is placed in ethyl alcohol in an autoclave and hydrogenated at a temperature of 80° C-110° C. in the presence of Raney nickel by passing in hydrogen. When no more hydrogen is taken up the autoclave is cooled and the reaction product removed. On distillation under reduced pressure (9 mm., for example) 3-methylbenzomorpholine is obtained.

3-ethylbenzomorpholine can be obtained in a similar manner by substituting α-chloromethylethylketone

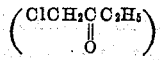

for α-chloromethylketone. It will be understood that other 2-nitrophenol compounds containing substituents which do not interfere with the reaction can be used in place of 2-nitrophenol in the foregoing reaction. Thus by the use of 6-methyl-2-nitrophenol, 6-chloro-2-nitrophenol, 6-methoxy-2-nitrophenol, 6-acetamino-2-nitrophenol, 4-methyl-2-nitrophenol, 4-chloro-2-nitrophenol, and 4-acetamino-2-nitrophenol, for example, 3,8-dimethylbenzomorpholine, 8-chloro-3-methylbenzomorpholine, 8-methoxy-3-methylbenzomorpholine, 8 - acetamino-3-methylbenzomorpholine, 3,6 - dimethylbenzomorpholine, 6-chloro - 3 - methylbenzomorpholine, and 6-acetamino - 3 - methylbenzomorpholine, respectively, can be obtained where α-chloromethylketone is used. The corresponding 3-ethylbenzomorpholine compounds are obtained where α-chloromethylethylketone is used.

By substituting chloroacetaldehyde $ClCH_2CHO$ for α-chloromethylketone in the reaction described for the preparation of 3-methylbenzomorpholine and using the nitrophenol starting compounds above mentioned benzomorpholine, 8-methylbenzomorpholine, 8 - chlorobenzomorpholine, 8 - methoxybenzomorpholine, 8-acetaminobenzomorpholine, 6-methylbenzomorpholine, 6-chlorobenzomorpholine and 6-acetaminobenzomorpholine, for example, can be prepared.

*Preparation of 3-methyl-6-trifluoromethylbenzomorpholine*

One gram mole of 3-nitro-4-hydroxytrifluoromethylbenzene is dissolved in 1 liter of ethanol and 1 gram mole of sodium ethylate is added. One gram mole of chloroacetone is then added slowly at room temperature and the reaction which takes place is completed by warming. The reaction mixture is filtered and the filtrate consisting of a solution of 3-nitro-4-acetonoxytrifluoromethylbenzene is purified by treatment with animal charcoal, filtered, and charged into a shaking autoclave together with 20 grams of Raney nickel. The reaction mixture is heated rapidly with shaking to 100° C. under a hydrogen pressure of 1800 pounds. When about 4 moles of hydrogen have been absorbed the reaction mixture is cooled, the nickel removed by filtration, and the desired product recovered by distillation under reduced pressure. The desired product boils at 91–94° C./1 mm.

*Preparation of 3-trifluoromethylbenzomorpholine*

One gram mole of o-nitrophenol is reacted with chlorotrifluoroacetone in accordance with the procedure described in connection with the preparation of 3-methyl-6-trifluoromethylbenzomorpholine and the resulting o-nitro-ω-trifluorophenoxyacetone is reduced to 3-trifluoromethylbenzomorpholine. The reduction is carried out in accordance with the procedure described for 3-methyl-6-trifluoromethylbenzomorpholine. The desired compound boils at 84–88° C./1 mm.

*Preparation of 6-trifluoromethylbenzomorpholine*

40 grams of sodium 2-nitro-4-trifluoromethylphenol, 500 c. of acetone and 1 gram of sodium iodide are placed in a suitable reaction vessel and 50 grams of bromoacetal $$\left(BrCH_2C\begin{matrix}H\\ \\ \end{matrix}\begin{matrix}O-C_2H_5\\O-C_2H_5\end{matrix}\right)$$

are slowly added stirring. The resulting 4-trifluoromethyl-2-nitrophenoxy-acetal is suspended in water and warmed with 10% aqueous hydrochloric acid following which it is hydrogenated with hydrogen in the presence of Raney nickel at 100° C. under a hydrogen pressure of 1500 lbs. A good yield of 6-trifluoromethylbenzomorpholine is obtained.

*Preparation of 3-trifluoromethyl-6-methoxybenzomorpholine*

40 grams of sodium-2-nitro-4-methoxyphenol, 500 cc. of acetone and 1 gram of sodium iodide are placed in a suitable reaction vessel and 32 grams of chlorotrifluoroacetone $$\left(ClCH_2\underset{\underset{O}{\|}}{C}CF_3\right)$$

are slowly added with stirring. The reaction which takes place is completed by heating with refluxing for a few hours. The reaction mixture is poured into water, slurried with aqueous 5% sodium hydroxide, the 2-nitro-4-methoxyphenoxytrifluoroacetone formed in the reaction is recovered by filtration, washed with water and dried.

The 2-nitro-4-methoxyphenoxytrifluoroacetone thus obtained is placed in a shaking autoclave together with 200 cc. of ethanol and 5 grams of Raney nickel and shaken with hydrogen at about 100° C. under a hydrogen pressure of 1500 lbs. When no more hydrogen is taken up, the bomb containing the reaction mixture is cooled, the Raney nickel removed by filtration and the filtrate distilled under reduced pressure, e. g. 5–10 mm. A good yield of 3-trifluoromethyl-6-methoxybenzomorpholine is obtained.

*Preparation of 3-trifluoromethyl-8-chlorobenzomorpholine*

This compound is obtained if one substitutes an equivalent gram molecular weight of 2-nitro-6-chlorophenol for 2-nitro-4-methoxyphenol in the example describing the preparation of 3-trifluoromethyl-6-methoxybenzomorpholine and proceeds as set forth in the example.

Additional benzomorpholine compounds that can be used in the preparation of the 4,5-trimethylenebenzomorpholine coupling compounds of our invention are described in Dickey and McNally copending application Serial No. 601,336, filed June 23, 1945, now Patent No. 2,442,345.

The azo compounds of our invention can be employed for the coloration of the materials named herein by the well-known methods, employed by those skilled in the art, for the coloration of these materials.

We claim:

1. An azo compound having the general formula:

$$R-N=N-R_1$$

wherein R represents a member selected from the group consisting of an aryl group of the benzene series containing but one benzene nucleus and an aryl group of the naphthalene series containing but one naphthalene nucleus and $R_1$ represents a 4,5-trimethylenebenzomorpholine nucleus, having the basic structure joined to the azo bond shown through the carbon atom in its 7-position.

2. An azo compound having the general formula:

$$R-N=N-R_1$$

wherein R represents an aryl group of the benzene series containing but one benzene nucleus and $R_1$ represents a 4,5-trimethylenebenzomorpholine nucleus, having the basic structure joined to the azo bond shown through the carbon atom in its 7-position.

3. An azo compound having the general formula:

wherein R represents an aryl group of the benzene series containing but one benzene nucleus.

4. An azo compound having the general formula:

wherein R represents an aryl group of the benzene series containing but one benzene nucleus and having a nitro group in the para position to the azo bond shown.

5. The azo compound having the formula:

6. The azo compound having the formula:

7. The azo compound having the formula:
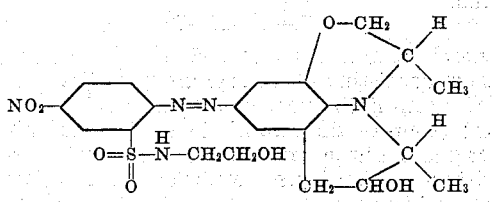
JOSEPH B. DICKEY.
JAMES G. McNALLY.
REFERENCES CITED
The following references are of record in the file of this patent:
UNITED STATES PATENTS
| Number | Name | Date |
|---|---|---|
| 2,196,222 | McNally et al. | Apr. 9, 1940 |
| 2,251,947 | McNally et al. | Aug. 12, 1941 |
| 2,317,365 | Dickey et al. | Apr. 27, 1943 |
| 2,342,678 | McNally et al. | Feb. 29, 1944 |
| 2,357,317 | Dickey et al. | Sept. 5, 1944 |
| 2,386,599 | Dickey et al. | Oct. 9, 1945 |